(12) United States Patent
Hong et al.

(10) Patent No.: US 11,251,456 B2
(45) Date of Patent: Feb. 15, 2022

(54) HEAT TREATMENT APPARATUS OF MEA FOR FUEL CELL

(71) Applicants: Hyundai Motor Company, Seoul (KR); Kia Motors Corporation, Seoul (KR)

(72) Inventors: Yoosuk Hong, Gyeonggi-do (KR); Sung Hoon Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 183 days.

(21) Appl. No.: 16/418,121

(22) Filed: May 21, 2019

(65) Prior Publication Data

US 2020/0153017 A1    May 14, 2020

(30) Foreign Application Priority Data

Nov. 9, 2018   (KR) .................. 10-2018-0137413

(51) Int. Cl.

| | | |
|---|---|---|
| *H01M 8/1086* | (2016.01) | |
| *H01M 8/04701* | (2016.01) | |
| *H01M 8/1018* | (2016.01) | |
| *H01M 8/1006* | (2016.01) | |

(52) U.S. Cl.
CPC ....... *H01M 8/109* (2013.01); *H01M 8/04731* (2013.01); *H01M 8/1006* (2013.01)

(58) Field of Classification Search
CPC ............ H01M 8/109; H01M 8/04731; H01M 8/1006; H01M 8/0273; H01M 8/1004; H01M 2008/1095; Y02E 60/50

USPC ......................................... 429/483
See application file for complete search history.

(56) References Cited

U.S. PATENT DOCUMENTS

| | | | | |
|---|---|---|---|---|
| 2017/0008200 | A1* | 1/2017 | Jeong ............... | B30B 15/0035 |
| 2017/0033384 | A1* | 2/2017 | Cho ................ | B32B 38/1858 |
| 2017/0069926 | A1* | 3/2017 | Jeong ............... | H01M 8/0273 |
| 2017/0069927 | A1* | 3/2017 | Jeong ............... | B32B 37/0053 |
| 2018/0337410 | A1* | 11/2018 | Lee ................ | H01M 4/8896 |

FOREIGN PATENT DOCUMENTS

| | | |
|---|---|---|
| KR | 101703618 B1 | 2/2017 |
| KR | 101776722 B1 | 9/2017 |

* cited by examiner

*Primary Examiner* — Christian Roldan
(74) *Attorney, Agent, or Firm* — Mintz Levin Cohn Ferris Glovsky and Popeo, P.C.; Peter F. Corless

(57) ABSTRACT

A heat treatment apparatus for a fuel cell membrane-electrode assembly is provided. The heat treatment apparatus includes a hot press installed on upper and lower sides of feeding path to move in the vertical direction on a frame and which presses the electrode catalyst layers on upper and lower surfaces of the membrane-electrode assembly sheet. A plurality of gripper modules are installed at set intervals in a base member along a feeding direction of the membrane-electrode assembly sheet, and selectively grip both side edges of the membrane-electrode assembly sheet. A driving unit reciprocally moves the base member in a direction perpendicular to the feeding direction of the membrane-electrode assembly sheet and in the feeding direction of the membrane-electrode assembly sheet.

8 Claims, 11 Drawing Sheets

HEAT TREATMENT APPARATUS OF MEA FOR FUEL CELL

CROSS-REFERENCE TO RELATED APPLICATION

This application claims priority to and the benefit of Korean Patent Application No. 10-2018-0137413 filed on Nov. 9, 2018, the entire contents of which are incorporated herein by reference.

BACKGROUND

(a) Field of the Invention

The present invention relates to a system for manufacturing membrane-electrode assemblies (MEAs) for fuel cells, and more particularly, to a heat treatment apparatus of a membrane-electrode assembly for a fuel cell for heat treatment of a membrane-electrode assembly.

(b) Description of the Related Art

As is known in the field, a fuel cell produces electricity by reaction, which is an electrochemical reaction of hydrogen and oxygen. Such a fuel cell is capable of continuously generating electricity by supplying chemical reactants from the outside without a separate charging process. The fuel cell may be constructed by disposing a separating plate or a bipolar plate on both sides of a membrane-electrode assembly (MEA).

In the membrane-electrode assembly, an anode layer and a cathode layer are transferred as electrode catalyst layers on both sides of a polymer membrane through which hydrogen ions migrate. The membrane-electrode assembly is combined with a sub gasket for protecting the electrode catalyst layer and the electrolyte membrane, and securing the assemblability of the fuel cell. The membrane-electrode assembly is manufactured by unwinding an electrolyte membrane wrapped in a roll form, releasing a release paper wrapped in a roll form, passing the electrolyte membrane and the release paper between the roll presses and discharging the electrode catalyst layer on both sides of the electrolyte membrane at a high temperature and a high pressure, and thereby producing a bonded electrode film sheet.

Further, the sub-gasket wound in the form of a roll is unwound and positioned on both sides of the electrode membrane sheet, and these are passed between hot rollers to produce a membrane-electrode assembly sheet in which the edge of the electrode membrane sheet and the sub gasket are bonded. After this process, the membrane-electrode assembly sheet wound in a roll form is unscrewed and the membrane-electrode assembly sheet is cut into a unit form including an electrode catalyst layer, thereby completing the manufacture of the membrane-electrode assembly.

As described above, the process of joining the electrode catalyst layers to both surfaces of the electrolyte membrane by the roll press method and manufacturing the electrode membrane sheet enables the continuous joining process of the electrode catalyst layers and the process speed is rapid. However, the interfacial bond strength between the electrolyte membrane and the electrolyte membrane is insufficient. Generally, membrane-electrode assembly is superior in performance and durability as the adhesion between the electrode catalyst layer and the electrolyte membrane is better. However, the performance and durability of the membrane-electrode assembly may be reduced if elimination occurs at the interface between the electrode catalyst layer and the electrolyte membrane due to the lack of interface bonding strength between the electrode catalyst layer and the electrolyte membrane.

The above information disclosed in this section is merely for enhancement of understanding of the background of the invention and therefore it may contain information that does not form the prior art that is already known in this country to a person of ordinary skill in the art.

SUMMARY

The present invention provides a heat treatment apparatus for a membrane-electrode assembly for a fuel cell that presses the electrode catalyst layer of a membrane-electrode assembly sheet at a high temperature by a hot press process. Additionally, the present invention provides a heat treatment apparatus for a membrane-electrode assembly for a fuel cell capable of preventing shrinkage and serpentine deformation of a membrane-electrode assembly sheet due to heat in a hot press process.

A heat treatment apparatus of a membrane-electrode assembly for a fuel cell according to an exemplary embodiment of the present invention may include a hot press installed on upper and lower sides of feeding path to move in the vertical direction on a frame and configured to press the electrode catalyst layers on upper and lower surfaces of the membrane-electrode assembly sheet, a plurality of gripper modules installed at set intervals in a base member along a feeding direction of the membrane-electrode assembly sheet to selectively grip both side edges of the membrane-electrode assembly sheet and a driving unit configured to reciprocally move the base member in a direction perpendicular to the feeding direction of the membrane-electrode assembly sheet and in the feeding direction of the membrane-electrode assembly sheet.

The heat treatment apparatus may further include front and rear feeding roller assemblies for feeding the membrane-electrode assembly sheet along the feed path. The hot press may be disposed between the front and rear feeding roller assemblies. In addition, the hot press may include a plurality of press units with a pair of hot plates facing each other in vertical directions. The unit presses may be arranged to correspond to any one of the electrode catalyst layers and adjacent electrode catalyst layer.

Further, the heat treatment apparatus may further include a vision sensor configured to sense an interval between the electrode catalyst layers of the membrane-electrode assembly sheet and a position aligning unit configured to align a position of the hot press based on the interval of the electrode catalyst layer sensed by the vision sensor. The gripper module may include a fixed gripper body fixedly mounted on the base member and an operating gripper body coupled to a first operating cylinder mounted on the base member and selectively gripping the edges of the membrane-electrode assembly sheet together with the fixed gripper body.

The fixed gripper body and the operating gripper body may be formed as a long rectangular plate type and may be disposed along the feeding direction. A gripping protrusion and a gripping groove for gripping both side edge portions of the membrane-electrode assembly sheet in a stepped manner may be formed to the fixed gripper body and the operating gripper body, respectively. In addition, supporting protrusions for supporting both side edge portions of the membrane-electrode assembly sheet may be formed to the fixed gripper body and the operating gripper body, respectively. The support protrusions may be formed at predetermined intervals along a direction perpendicular to the feeding direction of the membrane electrode assembly sheet.

The driving unit may include a servo motor fixedly mounted on a mounting bracket disposed along the feed direction in a facility frame, a leadscrew connected to the servo motor, at least one moving block engaged with the lead screw and slidably coupled with the base member in a direction perpendicular to the feeding direction of the membrane-electrode assembly sheet, a guide block fixedly mounted on the mounting bracket and slidably coupled with the moving block along the feeding direction of the membrane-electrode assembly sheet and a second operating cylinder fixed to the moving block via a fixed bracket, connected with the base member, and configured to apply a forward and backward actuating force to the base member in a direction perpendicular to the feeding direction. The base member may be slidably coupled to the moving block through a guide rail in a direction perpendicular to the feeding direction. The hot press may thermally compress the electrode catalyst layer with a heat treatment protective film supplied to the upper and lower surfaces of the membrane electrode assembly sheet.

A heat treatment apparatus of a membrane-electrode assembly for a fuel cell according to an exemplary embodiment of the present invention may include a hot press disposed between front and rear feeding roller assemblies for feeding the membrane-electrode assembly sheet along a feed path and pressing an electrode catalyst layer portions on upper and lower surfaces of the membrane-electrode assembly sheet at a predetermined temperature, a plurality of gripper modules installed at predetermined intervals along a feeding direction of the membrane-electrode assembly sheet to grip both side edges of the membrane-electrode assembly sheet and a cooling unit installed in the feeding roller assembly on the rear side to inject cooling air to the membrane-electrode assembly sheet.

The front and rear feeding roller assemblies each may include upper and lower feeding rollers rotatably mounted on front and rear roller brackets. The cooling unit may be installed on the rear roller bracket and may be configured to inject cooling air to the opposite side of the feeding direction through the upper and lower feeding rollers on the rear side. The cooling unit may include a pair of cooling air receiving members disposed on the rear roller bracket in a vertical direction corresponding to the upper and lower feeding rollers in the rear and at least one air injection nozzle installed in each of the cooling air receiving members and configured to inject cooling air between the upper and lower feeding rollers.

The front and rear feeding roller assemblies may include a front and a rear upper and lower stopping bars installed on the front and rear roller brackets for selectively stopping travel or movement of the membrane-electrode assembly sheet. The hot press may thermally compress the electrode catalyst layer with a heat treatment protective film supplied to the upper and lower surfaces of the membrane electrode assembly sheet.

In the exemplary embodiment of the present invention, the interface bonding strength between the electrolyte membrane and the electrode catalyst layer on the membrane-electrode assembly sheet may be improved by heat-treating the membrane-electrode assembly sheet at a high temperature by hot pressing. Accordingly, it may possible to prevent the boundary portion between the electrolyte membrane and the electrode catalyst layer from being eliminated, thereby increasing the performance and durability of the membrane-electrode assembly and ensuring mass productivity.

In addition, in the exemplary embodiment of the present invention, since the electrode catalyst layer portion is thermo-pressed through the hot press while tension is applied to the membrane-electrode assembly sheet through the gripper module, and thus the hot-shrinkage and serpentine deformation may be prevented. Therefore, in the exemplary embodiment of the present invention, the product quality and productivity of the membrane-electrode assembly may be improved, and the reduction of the reaction area at the electrode catalyst layer may be prevented.

Further, in the exemplary embodiment of the present invention, cooling air may be sprayed to the membrane-electrode assembly through a cooling unit after hot pressing, and the electrode catalyst layer may be cooled as cooling air, and thus, wrinkle deformation of the sub-gasket may be prevented. As a result, the present invention may secure the lamination alignment of the fuel cell during the fuel cell stacking process and improve the yield of the fuel cell stack.

In addition, effects obtainable or predicted by the exemplary embodiments of the present invention will be directly or implicitly disclosed in the detailed description of the embodiments of the present invention. Various effects predicted according to an exemplary embodiment of the present invention will be disclosed in a detailed description to be described later.

BRIEF DESCRIPTION OF THE DRAWINGS

These drawings are for reference purposes only and are not to be construed as limiting the technical idea of the present invention to the accompanying drawings.

DESCRIPTION OF SYMBOLS

Figure 1:
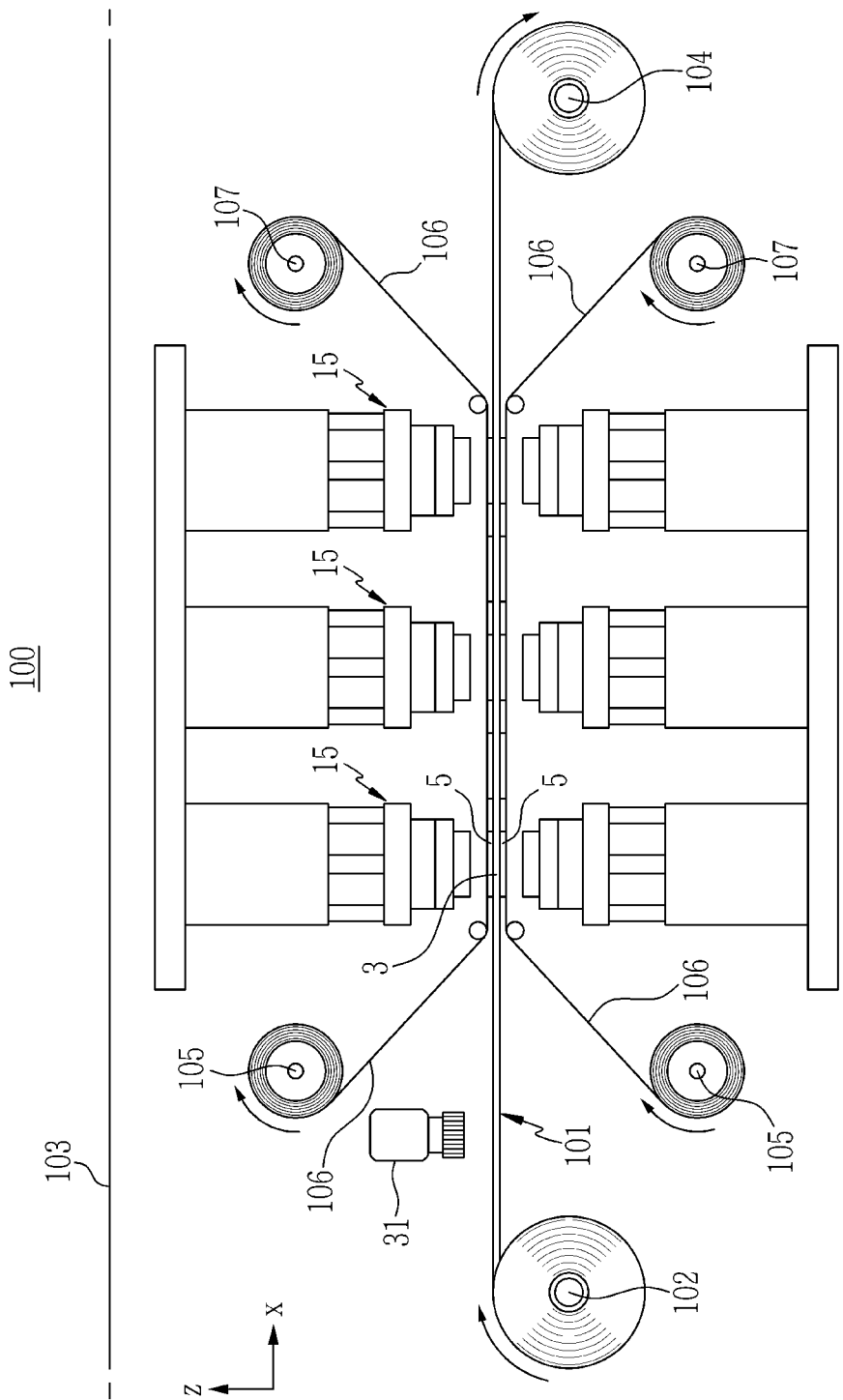
FIG. 1 is a schematic diagram illustrating a heat treatment apparatus of a membrane-electrode assembly for a fuel cell according to an exemplary embodiment of the present invention.

1: membrane-electrode assembly
3: electrolyte membrane
5: electrode catalyst layer
7: sub gasket
10: hot press
11: press frame
13: hot plate
15: press unit
21: feeding roller assembly
23: upper and lower feeding rollers
25: upper and lower stopping bars
29: roller bracket
31: vision sensor
35: position aligning unit
40: gripper module
41: base member
43: fixed gripper body
45: operating gripper body
46: first operating cylinder
47: gripping protrusion
48: support protrusion
49: gripping groove
60: driving unit
61: servo motor
63: lead screw
65: a moving block
67: guide block
69: second operating cylinder
71: mounting bracket
73: guide rail
75: fixed bracket
77: actuating rod
80: cooling unit
81: receiving member
85: air injection nozzle
101: membrane-electrode assembly sheet
102: sheet unwinder
103: facility frame
104: sheet rewinder
105: film unwinder
106: heat treatment protective film
107: film rewinder
100: heat treatment apparatus

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. In order to clearly illustrate the present invention, parts not related to the description are omitted, and the same or similar components are denoted by the same reference numerals throughout the specification.

Since the size and thickness of each configuration shown in the drawing are arbitrarily shown for convenience of explanation, the present invention is not necessarily limited to the one shown in the drawing, but the thickness is enlarged to clearly represent the various portions and regions. In the following detailed description, the names of components are categorized into the first, second, and so on in order to distinguish the components from each other in the same relationship, and are not necessarily limited to the order in the following description. It is to be understood that throughout the specification, unless otherwise indicated, all such modifications as may be made will be apparent to one of ordinary skill in the art without departing from the scope of the present invention. In addition, the terms " . . . unit", " . . . means", " . . . part", etc. in the specification are defined as a unit of at least one function or action, it means.

FIG. 1 is a schematic diagram schematically illustrating a heat treatment apparatus for a fuel cell membrane-electrode assembly according to an exemplary embodiment of the present invention. Referring to FIG. 1, a heat treatment apparatus 100 for a membrane-electrode assembly for a fuel cell according to an exemplary embodiment of the present invention may be applied to an automation system for automatically and continuously manufacturing parts of unit fuel cells constituting a fuel cell stack.

Figure 2:
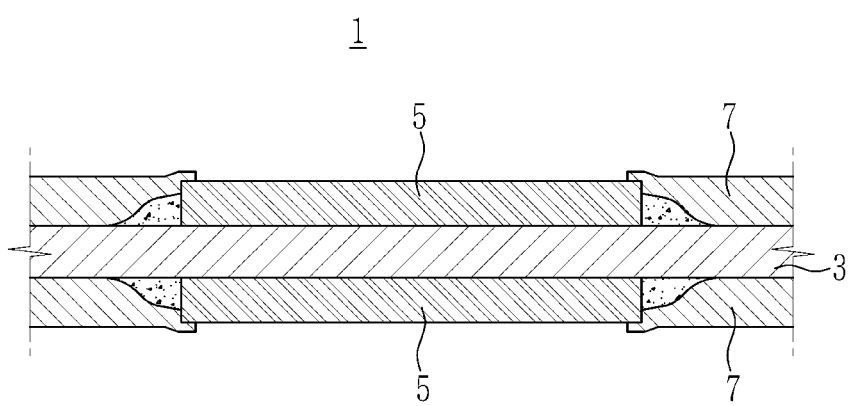
FIG. 2 is a drawing illustrating a membrane-electrode assembly manufactured by a heat treatment apparatus of a membrane-electrode assembly for a fuel cell according to an exemplary embodiment of the present invention.

The automation system may applied for manufacturing a membrane-electrode assembly 1 as a key component of the fuel cell as shown in FIG. 2, the electrode catalyst layer 5 may be transferred to both surfaces of the electrolyte membrane 3, and the sub-gasket 7 may be bonded to the edge of each electrode catalyst layer 5. The automation system may produce membrane-electrode assembly 1 as a roll-to-roll process. The roll-to-roll method is any process of applying coatings, printing, or performing other processes starting with a roll of a flexible material and re-reeling after the process to create an output roll.

In this roll-to-roll type automation system, the electrode catalyst layer 5 may be formed on both sides of the electrolyte membrane 3 at regular intervals, the sub-gasket 7 may be bonded to the edge of the electrode catalyst layer 5 of the electrolyte membrane 3, and then a membrane-electrode assembly sheet 101 may be manufactured. The automation system may include unwinding the roll-shaped membrane-electrode assembly sheet 101 and cutting the membrane-electrode assembly sheet 101 into a unit form including the electrode catalyst layer 5. In other words, the above-described automation system may automatically implement the entire manufacturing process for manufacturing the final membrane-electrode assembly 1, from the manufacturing process of the membrane-electrode assembly sheet 101 to the cutting process of the membrane-electrode assembly sheet 101.

Hereinafter, a roll-to-roll feeding facility in which a sheet roll wound in a roll shape is continuously supplied in a roll-to-roll manner will be described as an example. The roll-to-roll feeding facility may be defined as a plurality of transport rollers rotatably installed on the facility frame 103 provided in the up, down, back and left and right and left directions (e.g. vertical and horizontal directions). Each constituent element to be described below may be configured in the facility frame 103 as described above. The facility frame 103 supports each constituent element and may include one frame or a frame divided into two or more.

The facility frame 103 may include various sub-elements such as brackets, bars, rods, plates, housings, cases, and blocks to support each constituent element. However, since the above-described various sub-elements are provided for installing the respective components to be described below in the facility frame 103, in the exemplary embodiment of the present invention, the above-mentioned sub-elements are collectively referred to as a facility frame 103 except for exceptional cases.

The heat treatment apparatus 100 of the membrane-electrode assembly for a fuel cell according to an exemplary embodiment of the present invention is configured in the facility frame 103. The heat treatment apparatus 100 may be heat-treated in a hot press system that presses the electrode catalyst layer 5 of the membrane-electrode assembly sheet 101 at a high temperature (e.g., about 100 C to 300 C) and a high pressure (e.g., about 200 kfg/cm$^2$ to 1000 kfg/cm$^2$). The reason that the electrode catalyst layer 5 of the membrane-electrode assembly sheet 101 is heat-treated is for enhancing the interfacial bond strength the electrolyte membrane 3 and the electrode catalyst layer 5 and preventing the boundary portion between the electrolyte membrane 3 and the electrode catalyst layer 5 from being eliminated.

Particularly, the heat treatment apparatus 100 of the membrane-electrode assembly for a fuel cell according to an exemplary embodiment of the present invention is configured between the manufacturing process of the membrane-electrode assembly sheet 101 and the cutting process of the membrane-electrode assembly sheet 101. The membrane-electrode assembly sheet 101 may be wound, for example, in roll form into a sheet unwinder 102, unwound from a sheet unwinder 102, supplied to the heat treatment apparatus 100 along set feed path as heat-treated in the hot pressing method by the heat treatment apparatus 100, and then may be wound around a sheet rewinder 104.

In the exemplary embodiment of the present invention, a heat-treatment protective film 106 for protecting the membrane-electrode assembly sheet 101 may be supplied to the heat-treating apparatus 100 along the feed path. The heat treatment protective film 106 may be wound on a film unwinder 105 in the form of a roll and unwound from the film unwinder 105. The heat treatment protective film 106 may be supplied to the heat treatment apparatus 100 and then may be returned to a film rewinder 107.

Additionally, the heat treatment protective film 106 may be supplied to the upper and lower surfaces of the membrane electrode assembly sheet 101. The heat treatment protective film 106 may be thermally compressed together with the electrode catalyst layer 5 of the membrane electrode assembly sheet 101. The heat treatment protective film 106 may prevent the electrode catalyst layer 5 of the membrane electrode assembly sheet 101 from being damaged by high temperature and high pressure. For example, the heat-treatment protective film 106 may be formed of a heat-resistant material having a predetermined thickness.

The heat treatment apparatus 100 of the membrane-electrode assembly for a fuel cell according to the exemplary embodiment of the present invention may prevent shrinkage and serpentine deformation of the membrane-electrode assembly sheet 101 due to heat in the hot press process. In the above, the serpentine deformation refers to a deformation in which the membrane-electrode assembly sheet 101 is waved in a waveform along the width direction.

Figure 3:
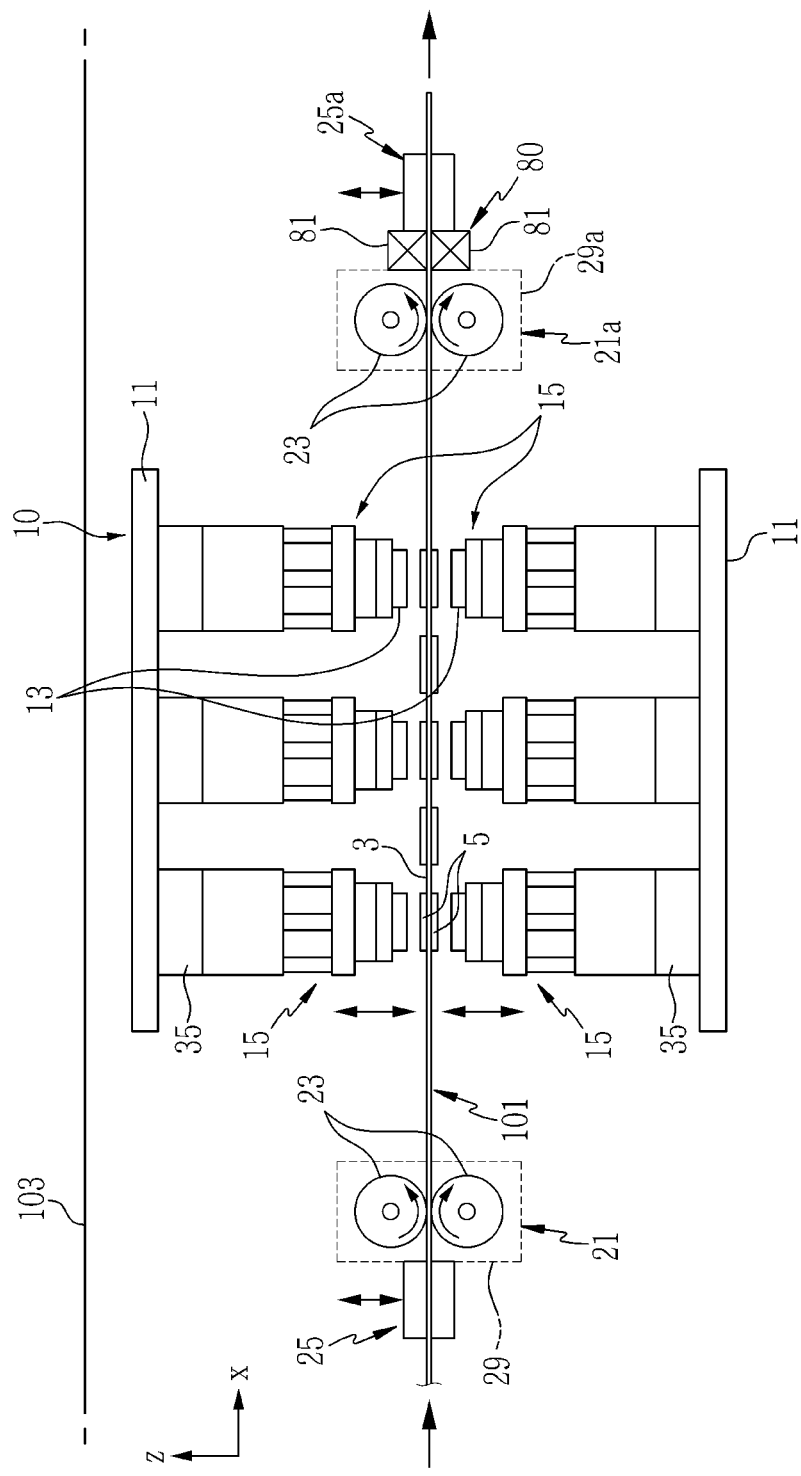
FIG. 3 is a drawing illustrating a hot press applied to a heat treatment apparatus of a membrane-electrode assembly for a fuel cell according to an exemplary embodiment of the present invention.

FIG. 3 is a drawing illustrating a hot press applied to a heat treatment apparatus of a membrane-electrode assembly for a fuel cell according to an exemplary embodiment of the present invention. Referring to FIG. 1 and FIG. 3, the heat treatment apparatus 100 may include a hot press 10 for pressing the portions of the electrode catalyst layer 5 on the upper and lower surfaces of the membrane-electrode assembly sheet 101 at a predetermined temperature.

In particular, the hot press 10 may be disposed on the upper and lower sides of the feed path of the membrane-electrode assembly sheet 101 and installed to move vertically with respect to the upper and lower surfaces of the membrane-electrode assembly sheet 101. In the exemplary embodiment of the present invention, the hot press 10 may be disposed between front and rear feeding roller assemblies 21 and 21a, which are configured in the facility frame 103 and feed the membrane-electrode assembly sheet 101 along the feed path. The front and rear feeding roller assemblies 21 and 21a may include an upper and lower feeding rollers 23 for feeding the membrane-electrode assembly sheet 101 along the feeding path.

The front and rear upper and lower feeding rollers 23 may be installed on front and rear roller brackets 29, 29a for rotatably supporting them. The front and rear feeding roller assemblies 21 and 21a may include front and rear stopping bars 25 and 25a for selectively stopping the supplying of the membrane-electrode assembly sheet 101. Additionally, the front and rear upper and lower stopping bars 25 and 25a may be arranged in the upper and lower pairs along the width direction of the membrane electrode assembly sheet 101 and one of them may be moved vertically by a known working cylinder, and thus the membrane electrode assembly sheet 101 may be allowed to be supplied or blocked while opening and closing operation.

The hot press 10 as described above may be installed in a press frame 11 provided in the facility frame 103. The hot press 10 may include a plurality of press units 15 arranged at predetermined intervals along the feeding direction of the membrane-electrode assembly sheet 101. The press unit 15 may include a pair of hot plates 13 facing each other along the vertical direction with the electrode catalyst layer 5 on the upper and lower surfaces of the membrane-electrode assembly sheet 101 interposed therebetween. In particular, the press units 15 may be disposed to correspond to one electrode catalyst layer 5 and the adjacent electrode catalyst layer 5.

The hot plate 13 is for thermos-compression bonding the portions of the electrode catalyst layer 5 on the upper and lower surfaces of the membrane-electrode assembly sheet 101. The hot plate 13 may be heated by a predetermined heat source such as a heating wire, a heating rod and the like at a set temperature and may be installed be movable in the vertical direction (the Z-axis direction in the figure) by a known working cylinder or servo motor.

In addition, the exemplary embodiment of the present invention may further include a vision sensor 31 configured to sense the interval of the electrode catalyst layer 5 of the membrane-electrode assembly sheet 101 entering to the hot press 10. The vision sensor 31 may be configured to detect the interval of the electrode catalyst layer 5 by line scan and output the detection signal to a controller (not shown). Since the vision sensor 31 may include a line scan type of sensor, which is well known in the art, a detailed description thereof will be omitted herein.

Further, in an exemplary embodiment of the present invention, the apparatus may further include a position aligning unit 35 configured to change the position of the press units 15 by receiving an operation control signal from the controller based on the interval of the electrode catalyst layer 5 sensed by the vision sensor 31. The position aligning unit 35 may include X-axis servo motor and a Y-axis servo motor configured to pull or push the press units 15 in the X-axis direction of the drawing, that is, in the feeding direction, the Y-axis in the drawing, that is, the direction perpendicular to the feeding direction to align the position of the press units 15.

The position aligning unit 35 may include a guide (not shown) having a lead (or ball) screw and a guide member (guide rail or guide rod) to convert the rotational force of the X-axis servo motor and the Y-axis servo motor. The positioning of the X-axis servo motor and the Y-axis servo motor by the operation of the lead (or ball) screw and the guide member will be apparent to those skilled in the art, and thus a detailed description thereof will be omitted.

Figure 4:
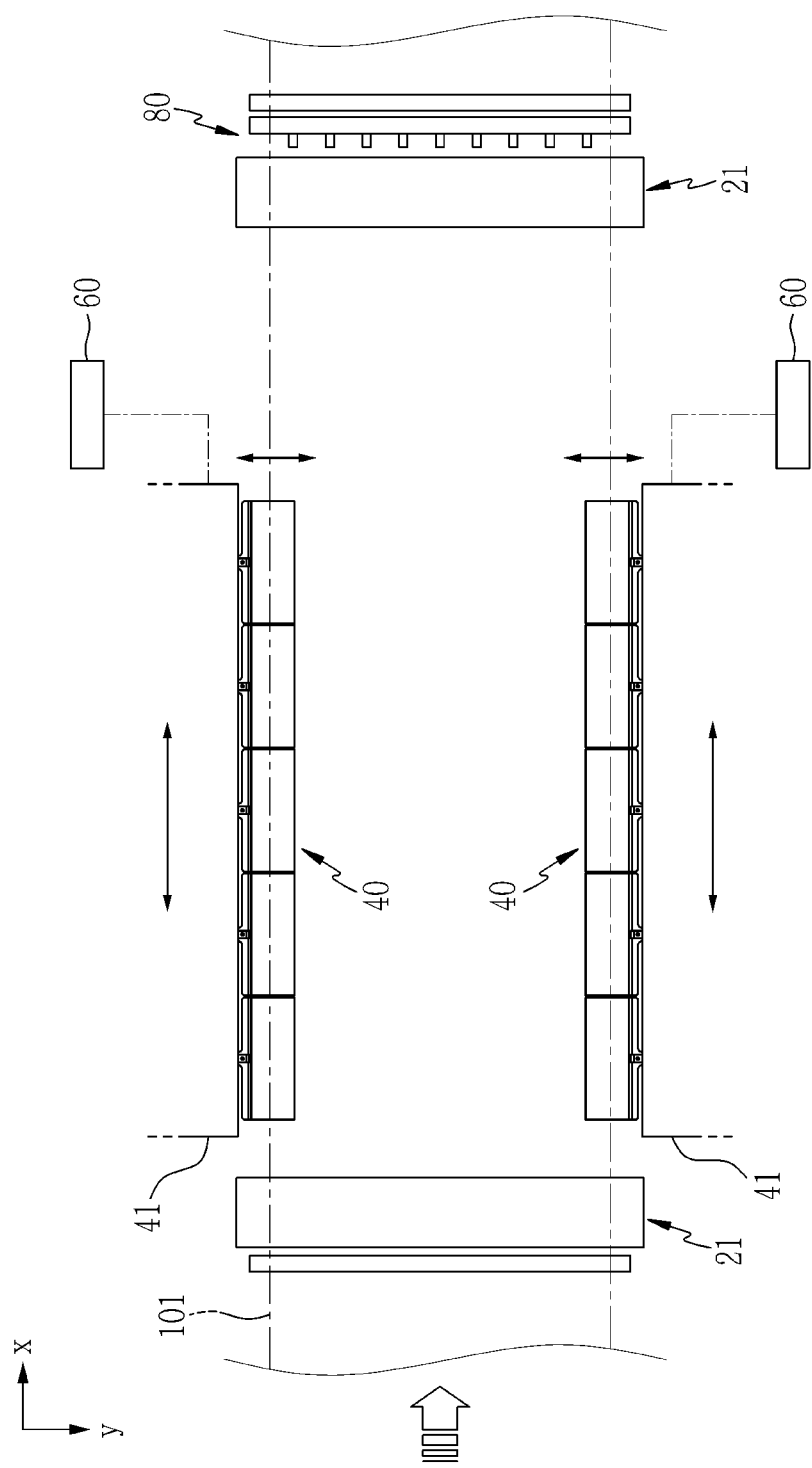
FIG. 4 is a drawing showing a gripper module, a driving unit and a cooling unit applied to a heat treatment apparatus of a membrane-electrode assembly for a fuel cell according to an exemplary embodiment of the present invention.

FIG. 4 is a drawing showing a gripper module, a driving unit and a cooling unit applied to a heat treatment apparatus of a membrane-electrode assembly for a fuel cell according to an exemplary embodiment of the present invention. Referring to FIG. 3 and FIG. 4, an exemplary embodiment of the heat treatment apparatus 100 of the membrane-electrode assembly for the fuel cell according to the present invention may further include a gripper module 40, a driving unit 60, and a cooling unit 80.

Particularly, the gripper module 40 may be configured to grip both edge portions of the membrane-electrode assembly sheet 101. The gripper module 40 may be attached to the membrane-electrode assembly sheet 101 before and after thermos-compression of the electrode catalyst layer 5 on the upper and lower surfaces of the membrane-electrode assembly sheet 101 through the hot press 10, and may be configured to apply tension in the direction perpendicular to the feeding direction of the membrane-electrode assembly sheet 101, that is, the Y-axis direction.

A plurality of the gripper modules 40 may be installed in the facility frame 103 through a base member 41 at predetermined intervals along the feeding direction of the membrane-electrode assembly sheet 101. The base member 41 may be provided in the form of a bracket having a predetermined length and may be disposed on both sides along the feeding direction of the membrane-electrode assembly sheet 101 between the front and rear feeding roller assemblies 21 and 21*a*.

Figure 5:
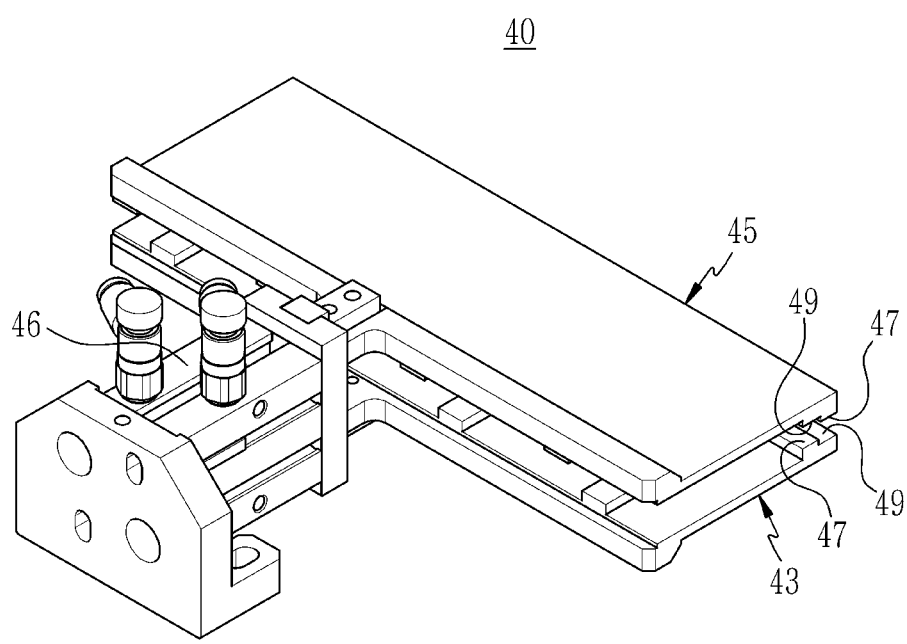
FIG. 5 is a perspective view showing a gripper module applied to a heat treatment apparatus of a membrane-electrode assembly for a fuel cell according to an exemplary embodiment of the present invention.
Figure 6:
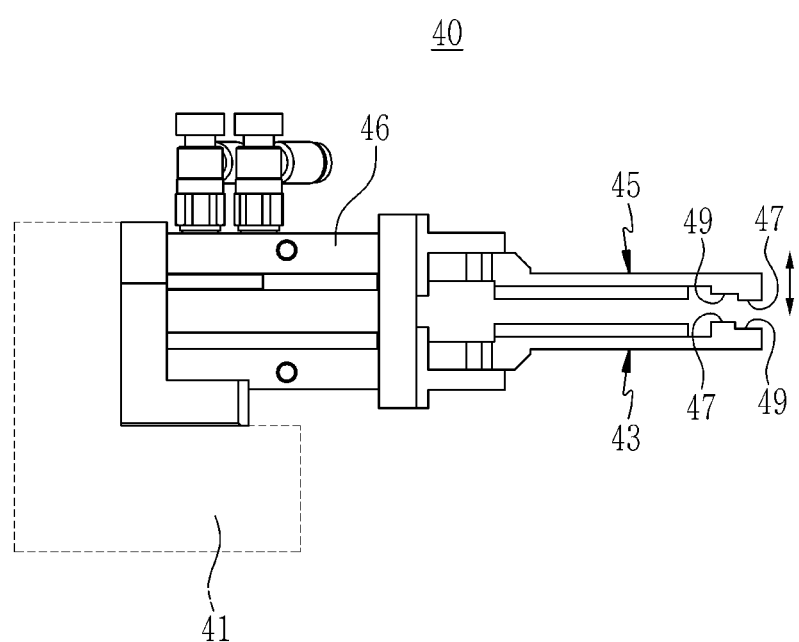
FIG. 6 is a side schematic diagram illustrating a gripper module applied to a heat treatment apparatus of a membrane-electrode assembly for a fuel cell according to an exemplary embodiment of the present invention.
Figure 7:
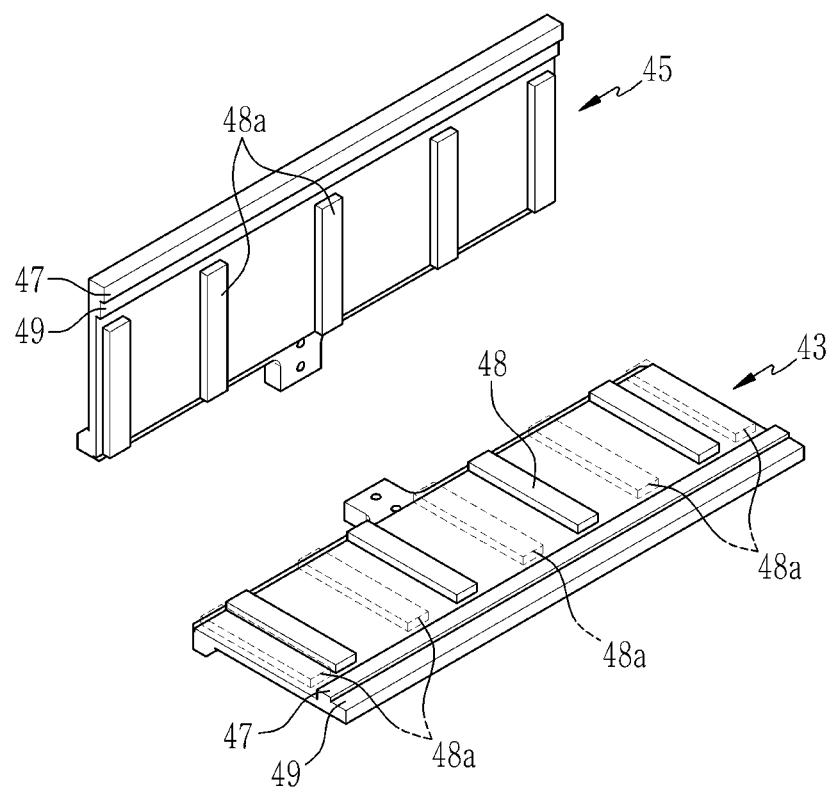
FIG. 7 is a drawing illustrating a fixed gripper body and an operating gripper body of a gripper module applied to a heat treatment apparatus of a membrane-electrode assembly for a fuel cell according to an exemplary embodiment of the present invention.

FIG. 5 is a perspective view showing a gripper module applied to a heat treatment apparatus of a membrane-electrode assembly for a fuel cell according to an exemplary embodiment of the present invention and FIG. 6 is a side schematic diagram illustrating a gripper module applied to a heat treatment apparatus of a membrane-electrode assembly for a fuel cell according to an exemplary embodiment of the present invention. Referring to FIG. 5 and FIG. 6, an exemplary embodiment of the present invention, the gripper module 40 may include a fixed gripper body 43 and an operating gripper body 45.

The fixed gripper body 43 may be mounted on the base member 41. The operating gripper body 45 may be connected to a first operating cylinder 46 disposed on the base member 41 and may be selectively actuated by the operation of the first operating cylinder 46 to selectively grip the edges of the electrode assembly sheet 101 together with the fixed gripper body 43. In particular, the first operating cylinder 46 provides the actuation force to the operating gripper body 45, and may be a drive cylinder configured to provide pneumatic force well known in the art, and a detailed description thereof will be omitted.

The fixed gripper body 43 and the operating gripper body 45 may be long rectangles (e.g., rectangular shaped) and may be arranged along the feeding direction of the membrane electrode assembly sheet 101 as shown in FIG. 4. The fixed gripper body 43 and the operating gripper body 45 may include gripping projections 47 and gripping grooves 47 for gripping both side edge portions of the membrane electrode assembly sheet 101 in the vertical direction. The gripping projections 47 and the gripping grooves 49 may be formed stepwise (e.g., with heights that increase incrementally) along the feeding direction of the membrane-electrode assembly sheet 101. In other words, the gripping projections 47 and the gripping grooves 49 may have portions thereof formed with gradual height differences that correspond to each other.

The gripping protrusions 47 and the gripping grooves 49 may be formed to correspond to the end portions of the fixed gripper body 43 and the operating gripper body 45 corresponding to both side edge portions of membrane electrode assembly sheet 101. For example, in the fixed gripper body 43, the gripping groove 49 may be elongated along the feeding direction of the membrane-electrode assembly sheet 101 at the end of the fixed gripper body 43. The gripping projections 47 may be elongated along the feeding direction of the membrane-electrode assembly sheet 101 inside the gripping grooves 49.

In the operating gripper body 45, the gripping protrusion 47 may be formed at the end of the operating gripper body 45 along the feeding direction of the membrane-electrode assembly sheet 101, and the gripping groove 49 may be formed along the feeding direction of the assembly sheet 101 inside of the gripping protrusion 47. Supporting protrusions 48, 48*a* may be formed on the fixed gripper body 43 and the operating gripper body 45 to support both side edges of the membrane electrode assembly sheet 101, and may be formed at predetermined intervals along a direction perpendicular to the feeding direction of the membrane electrode assembly sheet 101.

In other words, in the fixed gripper body 43, support protrusions 48 may be formed inside the gripping protrusion 47, and support protrusions 48*a* in the operating gripper body 45 may be formed inside the gripping groove 49. The support protrusions 48 and 48a may be staggered, that is, formed asymmetrically in the fixed gripper body 43 and the operating gripper body 45 to stagger both side edge portions of the membrane-electrode assembly sheet 101.

The support protrusions 48 and 48a may be disposed at predetermined intervals along the feeding direction of the membrane-electrode assembly sheet 101 to the fixed gripper body 43 and the movable gripper body 45. Additionally, the support protrusions 48 and 48a may be arranged in a non-face-to-face relationship with respect to the fixed gripper body 43 and the operating gripper body 45, respectively. In other words, when gripping both side edge portions of the membrane-electrode assembly sheet 101 through the fixed gripper body 43 and the operating gripper body 45, the support protrusions 48 and 48a are parallel and do not face each other.

Figure 8:
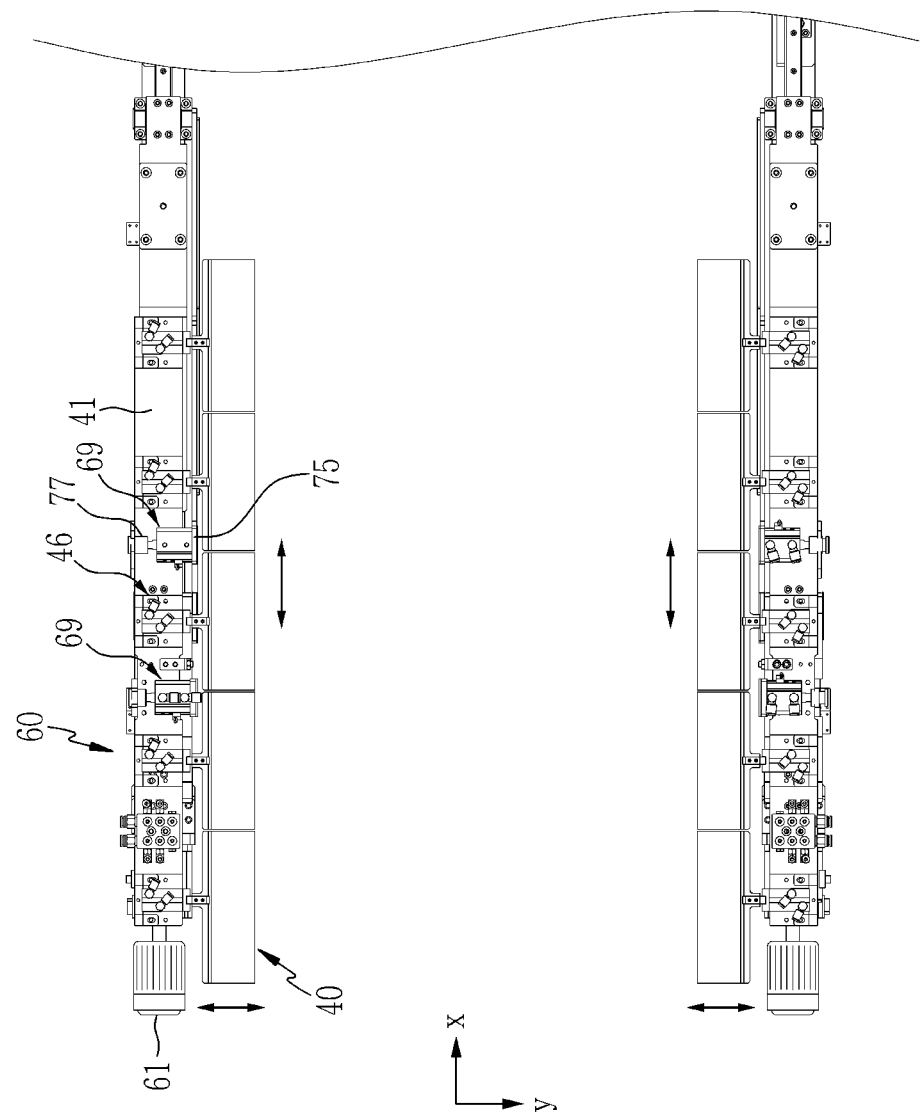
FIG. 8 and FIG. 9 are drawings illustrating a driving unit applied to a heat treatment apparatus of a membrane-electrode assembly for a fuel cell according to an exemplary embodiment of the present invention.
Figure 9:
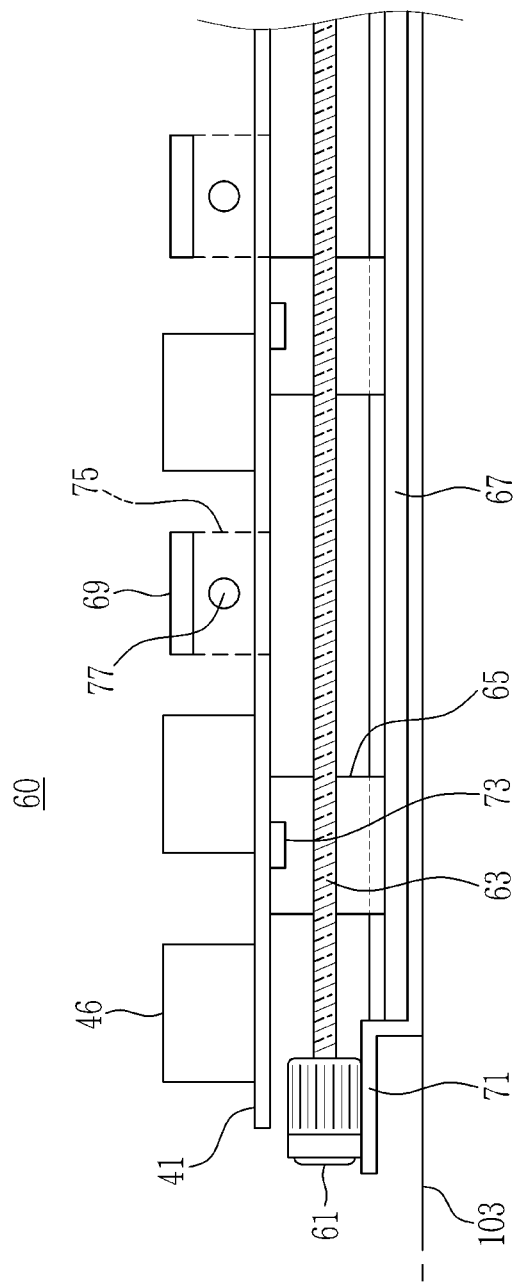

FIG. 8 and FIG. 9 are drawings illustrating a driving unit applied to a heat treatment apparatus of a membrane-electrode assembly for a fuel cell according to an exemplary embodiment of the present invention. Referring to FIG. 4 with FIG. 8 and FIG. 9, the drive unit 60 may be configured to move the base member 41 in which the gripper modules 40 are installed in a direction perpendicular to the feeding direction of the membrane electrode assembly sheet 101, that is, in the Y-axis direction and in the feeding direction of the membrane electrode assembly sheet 101, that is, in the X-axis direction.

Particularly, the driving unit 60 may be configured on both sides of the feeding path of the membrane-electrode assembly sheet 101. The driving unit 60 may include a servo motor 61, a lead screw 63, a moving block 65, and a guide block 67 for reciprocating the base member 41 along the X-axis direction, i.e., in the feeding direction of the membrane-electrode assembly sheet 101. The driving unit 60 may also include a second operating cylinder 69 for reciprocating the base member 41 in a direction perpendicular to the feeding direction of the membrane-electrode assembly sheet 101, that is, in the Y-axis direction.

The servo motor 61 may be a servo motor of known technology capable of servo control in rotation speed and rotating direction. The servo motor 61 may be installed on a mounting bracket 71 disposed along the feeding direction of the membrane-electrode assembly sheet 101 on both sides of the feeding path of the membrane-electrode assembly sheet 101 in the facility frame 103. The lead screw 63 may be connected to a drive shaft of the servo motor 61. The moving block 65 is a block divided into one or two or more, and may be screwed with the lead screw 63.

The base member 41 may be slidably coupled to the moving block 65 in a direction perpendicular to the feeding direction of the membrane-electrode assembly sheet 101. A guide rail 73 to which the base member 41 may be slidably engaged, may be installed in the moving block 65 along a direction perpendicular to the feeding direction of the membrane-electrode assembly sheet 101. The guide block 67 may be installed on the mounting bracket 71 along the feeding direction of the membrane-electrode assembly sheet 101. In the guide block 67, the moving block 65 may be slidably coupled along the feeding direction of the membrane-electrode assembly sheet 101.

In the exemplary embodiment of the present invention, the second operating cylinder 69 may be configured to apply a forward/backward actuating force to the base member 41 in the direction perpendicular to the feeding direction of the membrane-electrode assembly sheet 101 and may be a pneumatic cylinder using pneumatic. The second operating cylinder 69 may be fixed to the moving block 65 via a fixing bracket 75. Additionally, the the second operating cylinder 69 may be connected to the base member 41 via an actuating rod 77. When the actuating rod 77 of the second operating cylinder 69 is moved back and forth, the base member 41 on which the gripper modules 40 are mounted may be guided along the guide rail 73 on the moving block 65 in a direction perpendicular to the feeding direction of the electrode assembly sheet 101.

Figure 10:
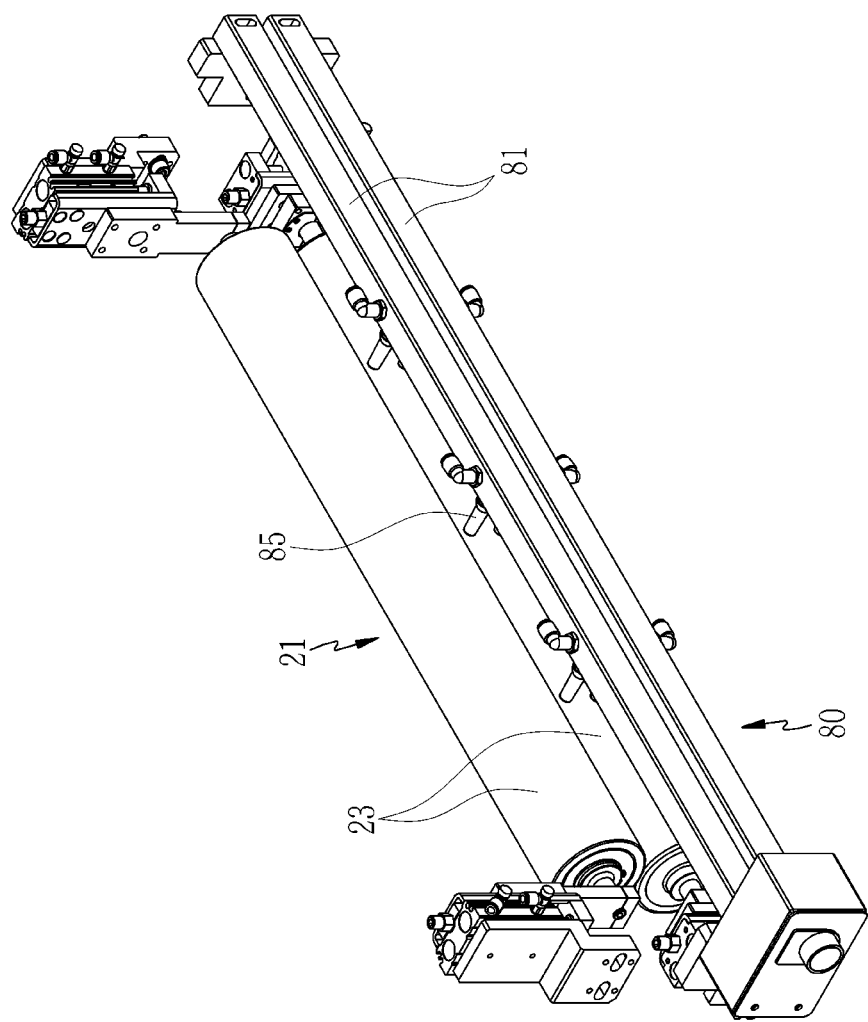
FIG. 10 and FIG. 11 are drawings showing a cooling unit applied to a heat treatment apparatus of a membrane-electrode assembly for a fuel cell according to an exemplary embodiment of the present invention.
Figure 11:
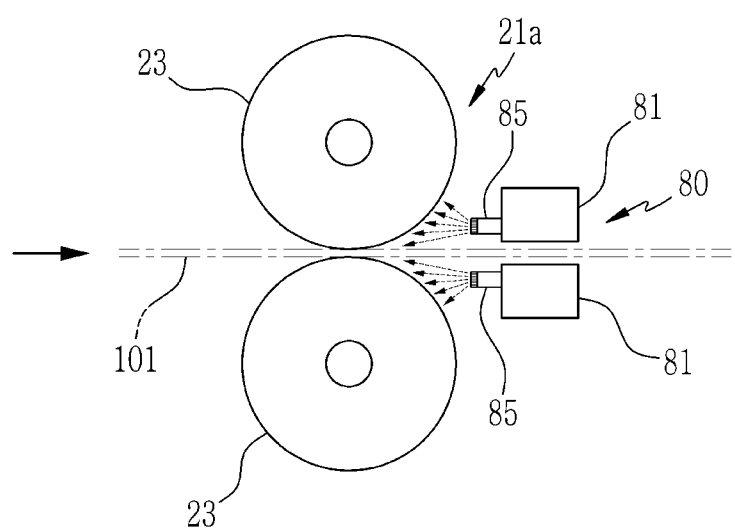

Referring to FIG. 3 and FIG. 4, the cooling unit 80 according to an exemplary embodiment of the present invention may be configured to cool the electrode catalyst layer 5 of the membrane-electrode assembly sheet 101 by injecting air to the membrane-electrode assembly sheet 101 after thermally compressed by the hot press 10. FIG. 10 and FIG. 11 are drawings showing a cooling unit applied to a heat treatment apparatus of a membrane-electrode assembly for a fuel cell according to an exemplary embodiment of the present invention.

Referring to FIG. 10 and FIG. 11 together with FIG. 4, the cooling unit 80 according to the exemplary embodiment of the present invention may be installed in the rear feeding roller assembly 21a. That is, the cooling unit 80 may be installed on the rear roller bracket 29a for rotatably supporting the upper and lower feeding rollers 23 of the rear feeding roller assembly 21a. The cooling unit 80 may be configured to inject cooling air to the opposite direction of the feeding direction of the membrane-electrode assembly sheet 101 through the upper and lower feeding rollers 23 through which the membrane-electrode assembly sheet 101 passes.

Further, the cooling unit 80 may include a pair of cooling air receiving members 81 and at least one air injection nozzle 85. The pair of housing members 81 accommodate cooling air supplied through an air compressor (not shown in the drawing) and may be in the form of a bar having a space for receiving cooling air. The pair of receiving members 81 may be disposed parallel to each other at a predetermined interval in the vertical direction on the rear roller bracket 29a corresponding to the space between the upper and lower feeding rollers 23. In addition, the pair of receiving members 81 may be disposed along the width direction of the membrane-electrode assembly sheet 101 between the rear upper and lower stopping bars 25a and the upper and lower feeding rollers 23. The air injection nozzle 85 may be configured to inject the cooling air accommodated in the pair of receiving members 81 between the upper and lower feeding rollers 23 and the air injection nozzles 85 may be spaced apart from each other at a predetermined interval.

Hereinafter, the operation of the heat treatment apparatus 100 of the membrane-electrode assembly for a fuel cell according to the exemplary embodiment of the present invention will be described in detail with reference to the drawings. The membrane-electrode assembly sheet 101 wound in a roll form in the sheet unwinder 102 may be unwound and fed to the press units 15 of the hot press 10. In particular, the front and rear feeding roller assemblies 21 and 21a may transport the membrane electrode assembly sheet 101 to the hot press 10 via the upper and lower feeding rollers 23.

At this time, the gripper modules 40 are in a state in which the gripping of the membrane-electrode assembly sheet 101 may be released through the fixed gripper body 43 and the operating gripper body 45 by the backward operation of the first operating cylinder 46. The gripper modules 40 are in the state of being moved to the side edges of the membrane-electrode assembly sheet 101 through the base member 41 by the backward operation of the second operating cylinder 69.

In the process of transferring the membrane-electrode assembly sheet 101 to the press units 15 of the hot press 10 in the above-described state, the operating gripper body 45 may be moved forward by the forward operation of the first operation cylinder 46 at a predetermined initial position and grip both side edge portions of the membrane-electrode assembly sheet 101 together with the fixed gripper body 43. Then, the gripper modules 40 may be moved in the direction perpendicular to the feeding direction of the membrane-electrode assembly sheet 101 with the base member 41 by the forward operation of the second operating cylinder 69.

In other words, the membrane-electrode assembly sheet 101 may be pulled outwardly in the width direction of the membrane-electrode assembly sheet 101. Accordingly, as the gripper modules 40 move outward in the width direction of the membrane-electrode assembly sheet 101 while gripping both side edges of the membrane-electrode assembly sheet 101, tension may be applied to the membrane-electrode assembly sheet 101.

Next, in an exemplary embodiment of the present invention, when the membrane-electrode assembly sheet 101 is allowed to run (e.g., travel, move, etc.) by opening the front and rear upper and lower stopping bars 25 and 25a, the servo motor 61 may be driven to move the gripper modules 40 through the base member 41 for a predetermined period of time along the feeding direction of the membrane electrode assembly sheet 101. At this time, the gripper modules 40 may be synchronized with the feeding speed of the membrane-electrode assembly sheet 101 and may move along the feeding direction of the membrane-electrode assembly sheet 101. The fixed gripper body 43 and the operating gripper body 45 of the gripper module 40 may be rectangular plate type gripping both side edge portions of the membrane-electrode assembly sheet 101.

The fixed gripper body 43 and the operating gripper body 45 of the gripper module 40 may be fixed to the both side edges of the membrane electrode assembly sheet 101 through the gripping projections 47 and the gripping grooves 49. Further, the fixed gripper body 43 and the operating gripper body 45 of the gripper module 40 may support the opposite side edge portions of the membrane-electrode assembly sheet 101 through the support protrusions 48. Therefore, in the exemplary embodiment of the present invention, the fixed gripper body 43 of the gripper module 40 and the operating gripper body 45 may stably grasp both side edges of the membrane-electrode assembly sheet 101 and thus tension may be applied to the assembly sheet 101.

In this process, the gap of the electrode catalyst layer 5 of the membrane-electrode assembly sheet 101 entering the hot press 10 may be sensed by the vision sensor 31 and the detection signal may be transmitted to the controller. The controller may be configured to apply an actuation control signal to the position aligning unit 35 based on the gap of the electrode catalyst layer 5 sensed by the vision sensor 31. The position aligning unit 35 may then be configured to move the press units 15 in the X-axis direction and Y-axis direction for aligning the position of the press units 15 based on the gap of the electrode catalyst layer 5.

Therefore, the thermos-compression bonding position of the hot press 10 may be corrected using the position aligning unit 35 based on the interval between the electrode catalyst layers 5, and thus, it may be possible to flexibly respond to the positional dispersion. Further, the positions of the press units 15 may be aligned in accordance with the intervals of the electrode catalyst layers 5 as described above, the front and rear upper and lower stopping bars 25 and 25a may be closed and the electrode catalyst layer 5 on the upper and lower surfaces of the membrane electrode assembly sheet 101 may be thermally bonded through the press units 15 of the hot press 10 while preventing the electrode assembly sheet 101 from running (e.g., moving).

During the above process, the heat treatment protective film 106 may be unwound from the film unwinder 105, fed to the hot press 10, and rewound to the film rewinder 107. The heat-treatment protective film 106 may be applied to the upper and lower surfaces of the membrane-electrode assembly sheet 101 and the upper and lower surfaces thereof are covered with the heat-treatment protective film 106 may be thermos-compression bonded together with a portion of the electrode catalyst layer 5 through the hot press 10.

Accordingly, when the electrode catalyst layer 5 is thermally compressed by the hot pressed 10, it may be possible to prevent the portion of the electrode catalyst layer 5 of the membrane electrode assembly sheet 101 from being damaged by the high temperature and high pressure through the heat treatment protective film 106. On the other hand, when the thermo-compression bonding of the membrane-electrode assembly sheet 101 by the hot press 10 is completed, the upper and lower stopping bars 25 on the front side may be closed and the upper and lower stopping bars 25a on the rear side may be opened, and then the electrode catalyst layer 5 may be cooled as cooling air through the cooling unit 80.

Particularly, the cooling unit 80 may be configured to inject cooling air to the opposite direction of the membrane-electrode assembly sheet 101 in the feeding direction through the upper and lower feeding rollers 23 behind the membrane-electrode assembly sheet 101. In other words, the cooling air supplied to the pair of housing members 81 may be sprayed between the upper and lower feeding rollers 23 through the air injection nozzle 85, and thus the portion of the catalyst layer 5 may be cooled as the cooling air.

After the above-described process, while the membrane-electrode assembly sheet 101 is allowed to run by the open operations of the front and rear upper and lower stopping bars 25 and 25a, the gripper module 40 may be moved to the both edge sides of the membrane-electrode assembly sheet 101 through the base member 41 by the backward operation of the second operating cylinder 69. At the same time, the gripping of the fixed gripper body 43 and the operating gripper body 45 to the membrane-electrode assembly sheet 101 may be released by the backward operation of the first operating cylinder 46.

The gripper modules 40 may then be moved in the direction opposite to the feeding direction of the membrane-electrode assembly sheet 101 through the base member 41 by driving the servo motor 61 and return to an initial position. Therefore, the above-described series of processes may be repeated and the electrode catalyst layer 5, which is the reaction surface on the upper and lower surfaces of the membrane electrode assembly sheet 101, may be heat treated through the hot press 10.

According to the heat treatment apparatus 100 of the membrane-electrode assembly for a fuel cell according to an exemplary embodiment of the present invention, it may be possible to heat-treat the membrane-electrode assembly sheet 101 through the hot press 10 in a hot press method in which the membrane-electrode assembly sheet 101 is pressurized at a high temperature. Therefore, the interface bonding strength between the electrolyte membrane 3 and the electrode catalyst layer 5 with respect to the membrane-electrode assembly sheet 101 may be improved, and a boundary between the membrane 3 and the electrode catalyst layer 5 may be prevented from being eliminated. Thus, it may be possible to increase the performance and durability of the membrane-electrode assembly and to ensure mass productivity.

Since the electrode catalyst layer 5 may be thermally bonded through the hot press 10 when tension is applied to the membrane electrode assembly sheet 101 through the gripper module 40, it may be possible to prevent shrinkage and serpentine deformation of the membrane-electrode assembly sheet 101 due to the high temperature and high pressure of the press 10, and to prevent reduction of the reaction area at the electrode catalyst layer 5. Furthermore, after hot pressing of the hot press 10, cooling air may be sprayed to the membrane-electrode assembly sheet 101 through the cooling unit 80, and the portion of the electrode catalyst layer 5 is cooled and thus, wrinkle deformation of the sub gaskets 7 may be prevented. Therefore, the stacking degree of the fuel cell may be ensured in the process of stacking the fuel cells, and the yield of the fuel cell stack may be further improved.

While the present invention has been particularly shown and described with reference to exemplary embodiments thereof, it is to be understood that the invention is not limited to the disclosed exemplary embodiments, other embodiments may easily be suggested by adding, changing, deleting, adding, or the like of elements, but this also falls within the scope of the present invention.

What is claimed is:

1. A heat treatment apparatus of a membrane-electrode assembly fora fuel cell, comprising:
   a hot press installed on upper and lower sides of a feeding path to move in a vertical direction on a frame and which presses electrode catalyst layers on upper and lower surfaces of a membrane-electrode assembly sheet;
   a plurality of gripper modules installed at set intervals in a base member along a feeding direction of the membrane-electrode assembly sheet, and selectively gripping both side edges of the membrane-electrode assembly sheet; and
   a driving unit configured to reciprocally move the base member in a direction perpendicular to the feeding direction of the membrane-electrode assembly sheet and in the feeding direction of the membrane-electrode assembly sheet,
   wherein each of the plurality of gripper modules includes:
      a fixed gripper body fixedly mounted on the base member; and
      an operating gripper body coupled to a first operating cylinder mounted on the base member and configured to selectively grip the edges of the membrane-electrode assembly sheet together with the fixed gripper body,
   wherein a gripping protrusion and a gripping groove configured for gripping both side edge portions of the membrane-electrode assembly sheet in a stepped manner are formed at the fixed gripper body and the operating gripper body respectively,
   wherein supporting protrusions configured for supporting both side edge portions of the membrane-electrode assembly sheet are formed to the fixed gripper body and the operating gripper body respectively, and
   wherein the supporting protrusions are formed at predetermined intervals along a direction perpendicular to the feeding direction of the membrane electrode assembly sheet.

2. The heat treatment apparatus of claim 1, further comprising:
   front and rear feeding roller assemblies for feeding the membrane-electrode assembly sheet along the feed path,
   wherein the hot press is disposed between the front and rear feeding roller assemblies.

3. The heat treatment apparatus of claim 1, wherein the hot press includes a plurality of press units with a pair of hot plates facing each other in verticals directions and wherein the plurality of press units are arranged to correspond to any one of the electrode catalyst layers and adjacent electrode catalyst layer.

4. The heat treatment apparatus of claim 1, further comprising:
   a vision sensor configured to sense an interval between the electrode catalyst layers of the membrane-electrode assembly sheet; and
   a position aligning unit configured to align a position of the hot press according to the interval of the electrode catalyst layer sensed by the vision sensor.

5. The heat treatment apparatus of claim 1, wherein the fixed gripper body and the operating gripper body are formed as rectangular plates and are disposed along the feeding direction.

6. The heat treatment apparatus of claim 1, wherein the driving unit includes:
   a servo motor fixedly mounted on a mounting bracket disposed along the feed direction in a facility frame;
   a lead screw connected to the servo motor;
   at least one moving block engaged with the lead screw and slidably coupled with the base member in a direction perpendicular to the feeding direction of the membrane-electrode assembly sheet;
   a guide block fixedly mounted on the mounting bracket and slidably coupled with the moving block along the feeding direction of the membrane-electrode assembly sheet; and
   a second operating cylinder fixed to the moving block via a fixed bracket, connected with the base member, and configured to apply a forward and backward actuating force to the base member in a direction perpendicular to the feeding direction.

7. The heat treatment apparatus of claim 6, wherein the base member is slidably coupled to the moving block via a guide rail in a direction perpendicular to the feeding direction.

8. The heat treatment apparatus of claim 1, wherein the hot press thermally compresses the electrode catalyst layer with a heat treatment protective film supplied to the upper and lower surfaces of the membrane-electrode assembly sheet.

* * * * *